United States Patent [19]

Skala

[11] 4,389,287

[45] Jun. 21, 1983

[54] WITHDRAWAL OF MOLTEN ALKALI HYDROXIDE THROUGH AN ELECTRODE FOR DEPLETION OF WATER DISSOLVED THEREIN

[76] Inventor: Stephen F. Skala, 3839 S. Wenonah Ave., Berwyn, Ill. 60402

[21] Appl. No.: 336,614

[22] Filed: Jan. 4, 1982

Related U.S. Application Data

[63] Continuation-in-part of Ser. No. 117,240, Jan. 31, 1980, Pat. No. 4,276,145, and a continuation-in-part of Ser. No. 221,552, Dec. 31, 1980, abandoned.

[51] Int. Cl.³ .................. C25B 15/08; C25C 3/02
[52] U.S. Cl. .................................. 204/68; 204/129; 204/232; 204/237; 204/245; 204/247; 204/DIG. 4
[58] Field of Search ............... 204/129, 247, 246, 232, 204/68, DIG. 3, DIG. 4, 237, 245

[56] References Cited

U.S. PATENT DOCUMENTS 2,667,454  1/1954  Roller .................................. 204/257
3,763,005 10/1973  Butre et al. .......................... 204/257

Primary Examiner—Howard S. Williams
Attorney, Agent, or Firm—Stephen F. Skala

[57] ABSTRACT

In an electrolysis cell, molten alkali hydroxide is decomposed into products which include alkali metal and water. The water dissolves in the electrolyte where it is decomposed by electrolysis or by reaction with alkali metal thereby reducing efficiency of the cell and yield of the alkali metal.

According to the process of the invention, the electrolyte with water dissolved therein is drawn through openings in an anode, is depleted of the dissolved water by a dehydrating means which is separate from the cell, and the dehydrated electrolyte is returned to an anolyte portion of the operating electrolysis cell for further decomposition.

According to the apparatus of the invention, the anode comprises a plurality of parallel elongated electrodes which alternate with parallel channels. The electrolyte flows from a return channel, over an electrode, and through a withdrawal channel for the depletion of water and return to operating portions of the electrolysis cell through the return channels.

6 Claims, 4 Drawing Figures

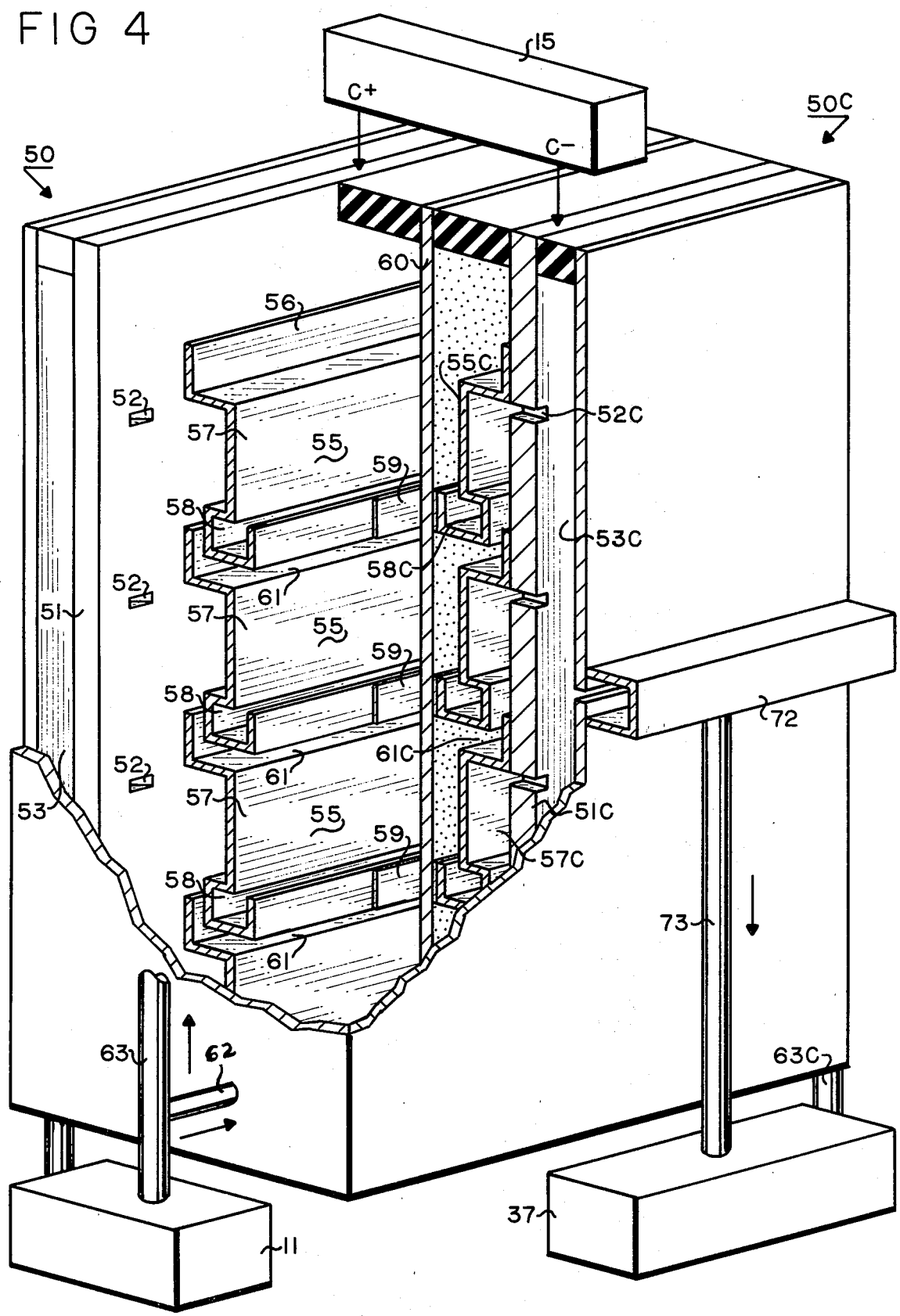

WITHDRAWAL OF MOLTEN ALKALI HYDROXIDE THROUGH AN ELECTRODE FOR DEPLETION OF WATER DISSOLVED THEREIN

This application is a continuation-in-part of Ser. No. 117,240 filed Jan. 31, 1980 and now U.S. Pat. No. 4,276,145; and is a continuation-in-part of Ser. No. 221,552 filed Dec. 31, 1980, now abandoned.

BACKGROUND

This invention relates to electrolysis of molten alkali hydroxide and particularly to depletion of water formed therein.

An ideally energy efficient cell for electrolyzing molten sodium hydroxide would operate at the reversible voltage to yield the decomposition $$2NaOH \rightarrow 2Na + H_2O + \tfrac{1}{2}O_2$$

with sodium forming on the cathode to dissolve in adjacent catholyte, with water forming on the anode to dissolve in adjacent anolyte, and with oxygen also forming on the anode in a gaseous phase which separates from the anolyte. This ideal cell would have an energy efficiency of 100% but Castner cells, which were an early commercial source of sodium metal, had an energy efficiency of less than 25%. These cells, disclosed by H. Y. Castner in U.S. Pat. No. 452,030 (1891), used a nickel gauze diaphragm to separate anolyte from catholyte to prevent their mixing which would have reduced decomposition yield to negligible quantities. But despite the diaphragm and operation near the electrolyte melting temperature which reduced solubility of the sodium, the accumulation of sodium and water to saturation and their diffusion toward opposite electrodes resulted in the secondary reaction $$Na + H_2O \rightarrow NaOH + \tfrac{1}{2}H_2$$

so that the two moles of sodium produced according to the decomposition of the ideal cell were diminished to one mole thereby limiting current efficiency of the Castner cells to 50%. Since ohmic loss in electrolyte between electrodes results in a voltage efficiency of about 50%, the expected energy efficiency of Castner cells is about 25%. Energy efficiency can thus be improved by reducing the parasitic reaction of sodium with water and by reducing interelectrode distance.

The secondary reaction may be reduced by depleting either the anolyte or the catholyte or both of their decomposition product which, because of the adverse effect on efficiency, is regarded as an impurity. One method for reducing anolyte water content is described by F. J. Dobrovolny in "Official Gazette" 1950, Vol. 637, pages 1575-6. The anolyte is circulated through a heating zone where it is flushed with an inert gas to remove water vapor. Current efficiency is substantially improved but thermal dehydration is not an energy efficient means for attaining low concentrations of water in sodium hydroxide. Another method for reducing anolyte water content, disclosed in the cited parent application, comprises circulating the anolyte through a second electrolysis cell which operates at a voltage sufficient to decompose water but not sufficient to decompose sodium hydroxide. Although such decomposition of water requires the same current as would be used to decompose the sodium hydroxide formed by the sodium-water parasitic reaction, the second cell operates at a lower voltage for improved energy efficiency. Overall energy efficiency of the dehydration process is further improved by transporting the hydrogen and oxygen decomposition products to a fuel cell for partial recovery of the electrical energy used to electrolyze the water.

An electrolysis cell with reduced interelectrode distance was disclosed by R. G. Cottam et al. in U.S. Pat. No. 3,242,059 wherein porous electrodes are adjacent to a diaphragm so that the interelectrode distance is the thickness of the diaphragm. The cell is a chlor-alkali diaphragm cell through which an aqueous solution of sodium chloride percolates. Chlorine gas forming on the porous anode passes therethrough and is thereby removed from operating portions of the cell. Sodium forming on the cathode reacts with water to form sodium hydroxide and hydrogen, both of which pass through the porous cathode. The porous electrodes enable reduced interelectrode distance with a consequent improvement of voltage efficiency, but the structure of Cottam's cell is not appropriate for drawing electrolyte through the porous electrode so that impurity therein can be depleted and the electrolyte returned into the cell for further electrolysis with a reduced parasitic reaction and improved current efficiency.

OBJECTS OF THE INVENTION

It is a general object to improve energy efficiency of molten alkali hydroxide electrolysis cells in which products of decomposition react to reduce energy efficiency and yield.

It is another object to provide an improved method and apparatus for withdrawing electrolyte from the cell so that incorporated water can be depleted and the electrolyte returned to the cell for further electrolysis at an improved current efficiency.

It is yet another object to reduce interelectrode distance of the cell thereby improving voltage efficiency.

SUMMARY

These and other objects and advantages are attained by the invention wherein molten alkali hydroxide is withdrawn through openings in an anode for depletion of water forming thereon and is returned for further electrolysis. As a molten alkali hydroxide electrolysis cell operates, water forms on the anode as a product of decomposition and dissolves in adjacent alkali hydroxide electrolyte. This electrolyte in which the water is most concentrated is withdrawn through the openings before the water can diffuse into the cell where parasitic reactions could occur to reduce current efficiency. The water may be depleted by electrolysis at a voltage between the decomposition voltages of the water and the alkali hydroxide. The dehydrated electrolyte preferably is returned to the cell through return openings in the anode.

The apparatus of the invention comprises an electrode assembly having a plurality of withdrawal channels and return channels to remove, condition, and return the electrolyte. An elongated electrode has a withdrawal channel on one edge and a return channel on another edge. An electrode assembly comprises a plurality of such elongated electrodes and channels. The electrolyte circulates from a return channel, over an elongated electrode, through a withdrawal channel through a means for conditioning the electrolyte, and back to the return channel. In an electrolysis cell for molten alakli hydroxide, a diaphragm is supported between anodes and cathodes by an electrical insulator thereon to maintain a small interelectrode gap for improved voltage efficiency.

DESCRIPTION OF THE DRAWINGS

FIG. 4 is a perspective drawing of a preferred embodiment of the apparatus of the invention wherein an electrolyte is withdrawn from an electrolysis cell through a plurality of elongated withdrawal channels in a electrode assembly for conditioning and is returned through a plurality of elongated return channels in said electrode assembly to enable rapid removal of impure electrolyte and to enable short interelectrode distance thereby improving both current and voltage efficiency.

FIG. 1 shows an electrolysis cell which decomposes molten sodium hydroxide. At the anode, anolyte with incorporated oxygen and water as impurities is drawn through a porous anode from operating portions of the cell for depletion of the impurities and return of the anolyte to operating portions of the cell for further electrolysis. At the cathode, catholyte with dissolved sodium metal is drawn through a porous cathode for depletion in a sodium separator and return to operating portions of the cell.

Figure 1:
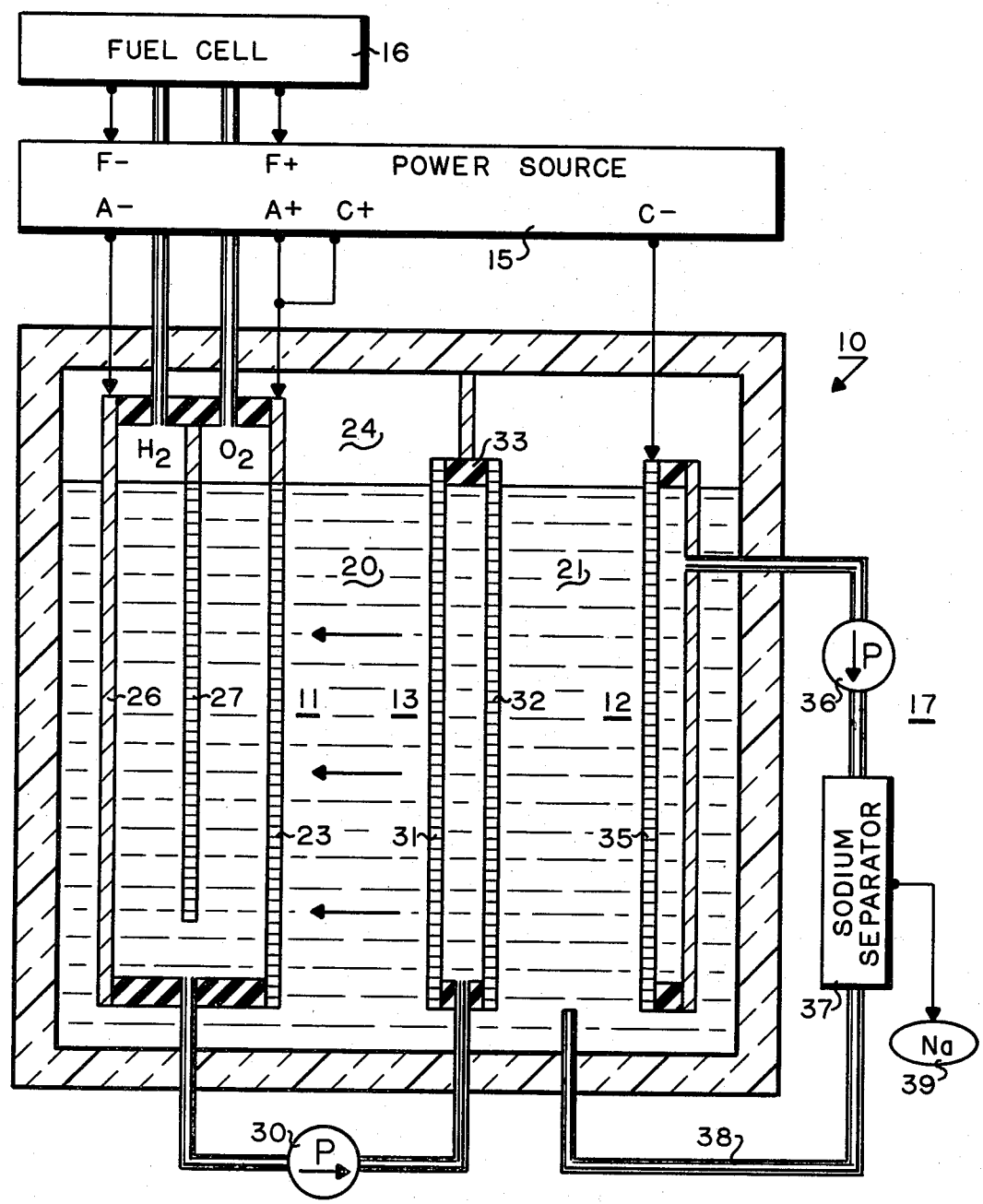
FIG. 1 is a schematic drawing of a molten alkali hydroxide electrolysis cell showing withdrawal of the alkali hydroxide through openings in an electrode for depletion of water formed in the alkali hydroxide according to the process of the invention.

Electrolysis cell 10 comprises an anolyte electrolytic dehydrator 11, a cathode assembly 12, and a diaphragm assembly 13. A power source 15 provides electrical power for electrolysis and receives electrical power from hydrogen-oxygen fuel cell 16. A sodium separation loop 17 reduces sodium metal content of electrolyte flowing therethrough. The diaphragm assembly 13 divides the electrolysis cell into an anolyte 20 portion and a catholyte 21 portion. In the anolyte portion, anode 23 has openings which may be perforations in a foil, interstices in a wire gauze or screen, or intergranular spaces in a sintered plate. The anode is fabricated from an electrical conductor which is compatible with sodium hydroxide such as nickel.

As the electrolysis cell operates, oxygen and water form on anode 23. A portion of the oxygen may rise into chamber 24 from which it is released through a vent, not shown. The remaining oxygen and substantially all of the water are incorporated into the anolyte and are drawn through the openings in the anode into the anolyte electrolytic dehydrator 11 which is an electrolysis cell operating at a voltage sufficient to decompose the dissolved water but not sufficient to decompose the sodium hydroxide. The anode 23, which connects to terminals A+ and C+, is common to the operating electrolysis cell 10 and the anolyte electrolytic dehydrator 11. The anode 23 and cathode 26 are separated by a porous diaphragm 27 which prevents oxygen which forms on the anode from mixing with hydrogen which forms on the cathode. The hydrogen and oxygen are transported to fuel cell 16 and react on electrodes therein, not shown, to generate electrical energy which is transmitted to terminals F+ and F− of power source 15 for use in electrolysis. After the anolyte has passed through the anolyte electrolytic dehydrator, it is returned to the electrolysis cell by pump 30 through diaphragm assembly 13. The diaphragm assembly comprises anolyte diaphragm 31 and a catholyte diaphragm 32 spaced apart by separators 33. The diaphragm has a porous structure and may be any conductive or nonconductive material compatible with molten alkali hydroxide. The diaphragm used in Castner cells, for example, is a nickel gauze.

As the electrolysis cell operates, sodium metal forming on cathode 35 dissolves in adjacent catholyte which is drawn through openings in the cathode. The cathode 35 is similar in structure and function to the anode 23. The catholyte is forced by pump 36 into sodium separator 37. The sodium separator is based on known methods for separating sodium metal from its hydroxide which include heating to reduce solubility of the metal in the hydroxide, distilling to vaporize the metal which has a lower boiling temperature, and scrubbing with mercury, lead, or other liquid compatible with alkali hydroxide and having substantially greater solubility for the metal than for its hydroxide. The catholyte with depleted sodium metal as impurity is returned to the catholyte portion of the electrolysis cell through conduit 38 and sodium metal is transported to a collector 39.

Figure 2:
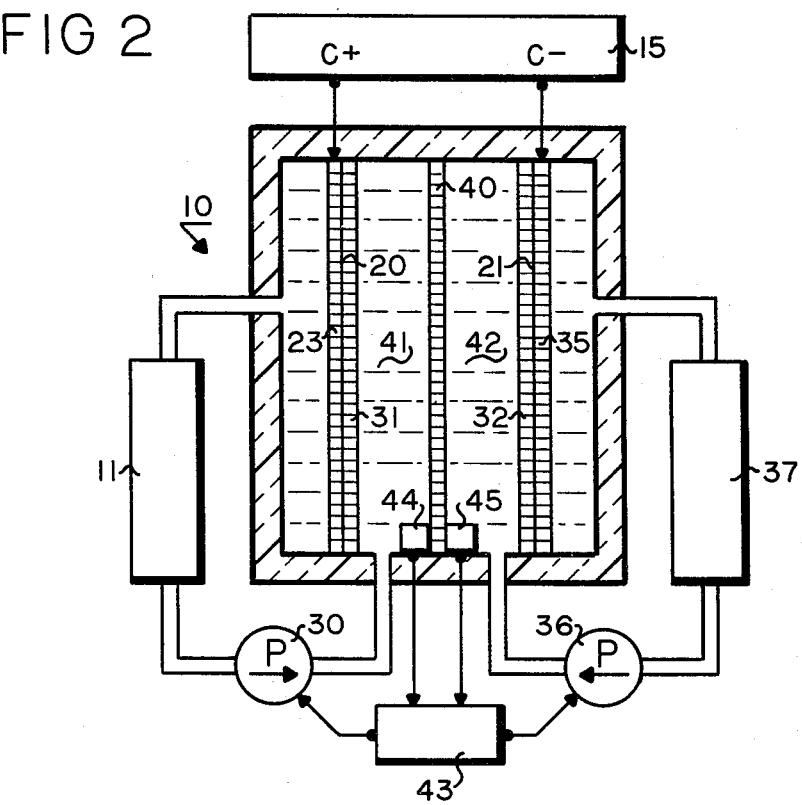
FIG. 2 is a schematic drawing of an alternative alkali hydroxide electrolysis cell wherein electrodes have a diaphragm adjacent thereto and another diaphragm separating returning anolyte and catholyte for reduced reaction of remaining impurities and improved current efficiency.
Figure 3:
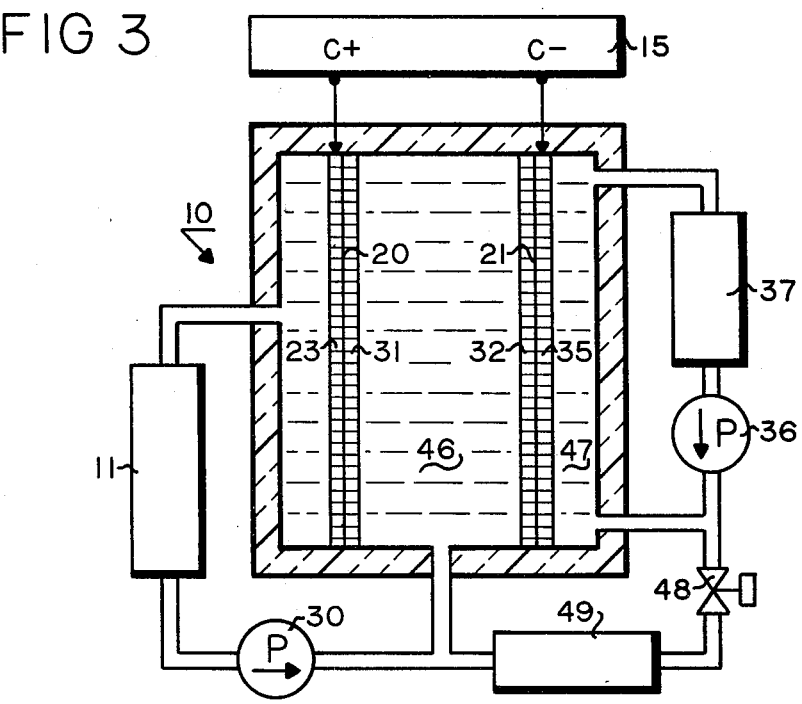
FIG. 3 is a schematic drawing of another alternative alkali hydroxide electrolysis cell wherein anolyte and catholyte are returned to a common interelectrode zone to enable a smaller gap between the electrodes for improved voltage efficiency.

In FIGS. 2 and 3, products of decomposition, which are the impurities, form on a porous electrode and are constrained to a reduced space by an adjacent diaphragm thereby reducing interelectrode gap for improved voltage efficiency. Electrolyte flowing through the diaphragm and electrode transports the impurities for depletion and is returned to the cell for further electrolysis.

Anode diaphragm 31 is adjacent to but electrically insulated from the anode 23 by an insulating film, not shown, or by fabricating the diaphragm from an insulating material. As the cell operates to decompose molten alkali hydroxide, water and oxygen form on the anode and are incorporated into anolyte 20 in the reduced anolyte space between the diaphragm and anode. Similarly, cathode diaphragm 32 is adjacent to but electrically insulated from the cathode 35. Alkali metal forming on the cathode dissolves in catholyte 21 in the reduced catholyte space between the cathode diaphragm and the cathode.

In FIG. 2 a zone diaphragm 40, which may be a nickel gauze, prevents anolyte from mixing with catholyte. Pump 30 operates to draw anolyte under a differential pressure through the anode diaphragm 31 and the anode 23, to transport the impurities forming on the anode through anolyte electrolytic dehydrator 11, and to return the dehydrated anolyte back into the cell. Similarly, pump 36 operates to draw catholyte through the cathode diaphragm 32 and the cathode 35, to transport the catholyte with its dissolved alkali metal through sodium separator 37, and to return the depleted catholyte back into the cell. The pumps are regulated by controller 43 in response to pressure sensors 44 and 45 to provide equal pressure on both sides of the zone diaphragm 40 so that the zone diaphragm will not be severely displaced to impede flow of electrolyte to the electrode diaphragms 31 and 32.

In FIG. 3, the electrolysis cell does not use a zone diaphragm to separate returning anolyte and catholyte but rather depletes both to a high degree for return to a common zone 46. Pump 30 operates to draw electrolyte from the common zone 46, through anode diaphragm 31 and anode 23, through anolyte dehydrator 11, and back to the common zone. The anolyte electrolytic dehydrator dehydrates the electrolyte to a high degree. Pump 36 operates to draw electrolyte from the common zone 46, through cathode diaphragm 32 and cathode 35, and through sodium separator 37 which depletes a substantial portion of sodium metal and returns most of the electrolyte to catholyte collector 47. A smaller portion of electrolyte flows through throttle valve 48 into a secondary sodium separator 49. The secondary sodium separator may be a distillation apparatus, a scrubber, or other means for attaining a high degree of depletion. The depleted electrolyte is returned to the cell for further electrolysis.

FIG. 4 illustrates the preferred embodiment of the invention wherein an electrode assembly of the electrolysis cell comprises a plurality of elongated electrodes each of which has an elongated withdrawal channel adjacent to one edge and an elongated return channel adjacent to the other edge. This structure enables the time over which gaseous and dissolved impurities remain in the cell to be brief thereby reducing the parasitic reactions and improving current efficiency. A diaphragm is supported by an electrical insulator to form a small gap between the elongated electrodes and the diaphragm to improve voltage efficiency.

An anode assembly 50 comprises an electrically conductive mounting plate 51 which supports electrode and channel structures and which has ports 52 through which the electrolyte is drawn into enclosure 53 for transport to the anolyte electrolytic dehydrator 11 for conditioning therein. Attached to the mounting plate 51 is a plurality of elongated electrode sections 55. Each of the electrode sections 55 has a plate mounting tab 56 which is bolted, welded, or otherwise mounted to the mounting plate 51; an outwardly projecting portion which supports elongated electrode 57 parallel to the mounting plate to form a gap therebetween for flow of the electrolyte; and a return channel 58 which mounts inwardly from the elongated electrode with an outer surface of the return channel having thereon an electrical insulating film 59 which supports diaphragm 60. The insulating film 59 is parallel to and projects slightly outward from the elongated electrode 55 to form a small gap between the elongated electrode and the diaphragm 60. A small gap results in a small ohmic loss. The electrode section 55 is preferably formed from a single metal plate which may be nickel for a molten alkali hydroxide electrolysis cell.

The electrode sections 55 are mounted parallel to each other on the mounting plate 51 with a separation between adjacent electrode sections to form withdrawal channels 61. The electrolyte circulates in a path through enclosure 53, through the anolyte electrolytic dehydrator 11, through conduit 62 and similar conduits not shown which branch from return main 63 into end portions of the return channels 58, over the elongated electrodes 57, through the withdrawal channels 61, and through the ports 52 into the enclosure 53.

A cathode assembly 50C comprises a plurality of electrode sections 55C attached to mounting plate 51C and is similar to the anode assembly 50. Catholyte is withdrawn from enclosure 53C, flows through channel 72, through withdrawal main 73, and into sodium separator 37. Depleted catholyte is returned to the electrolysis cell through return main 63C which connects to return channels 58C of electrode sections 55C through conduits not shown. The catholyte flows over elongated electrodes 57C, through withdrawal channels 61C, through ports 52C, and back into the enclosure 53C in a path which is similar to that described with reference to the anode assembly 50.

While several specific embodiments are described in detail herein, various modifications may be made without departing from the spirit and scope of the invention and it is intended that all such modifications be interpreted as contemplated by the invention.

I claim:

1. A process for depleting water which forms in molten alkali hydroxide during electrolysis thereof, comprising the steps of:
    operating an electrolysis cell by applying a voltage to electrodes therein whereby hydroxide ions are reduced on an anode and form the water which is incorporated into molten alkali hydroxide anolyte in an anolyte portion of the electrolysis cell,
    withdrawing the anolyte with the water incorporated therein through withdrawal openings in the anode thereby removing said anolyte from operating portions of the electrolysis cell,
    depleting the incorporated water from said removed anolyte in a means for dehydrating the anolyte which is separate from the operating portions of the cell to produce a dehydrated anolyte, and
    returning the dehydrated anolyte to the anolyte portion of the electrolysis cell for further electrolysis.

2. The process of claim 1 wherein the step of returning the dehydrated anolyte to the anolyte portion of the cell comprises forcing the dehydrated anolyte through return openings in the anode whereby the dehydrated anolyte flows from the return openings, over the anode where electrolysis and formation of water occur, and through the withdrawal openings.

3. The process of claim 2 wherein the step of depleting the incorporated water from the removed anolyte in the means for dehydrating the anolyte comprises electrolyzing the water at a voltage which is between the decomposition voltages of water and alkali hydroxide.

4. An electrolysis cell, comprising:
    an electrode assembly which includes a mounting plate, an electrolyte, and means for conditioning the electrolyte separate from operating portions of the cell,
    a plurality of withdrawal channels in the electrode assembly, each said withdrawal channel being parallel and adjacent to an edge of an elongated electrode, each said electrode having means for mounting to the mounting plate,
    means for transporting the electrolyte from the withdrawal channels to said means for conditioning the electrolyte,
    a plurality of return channels in the electrode assembly, each said return channel being parallel and adjacent to an edge of an elongated electrode, and
    means for transporting the electrolyte from the means for conditioning the electrolyte to the return channels whereby the electrolyte circulates through the return channels, over the electrode assembly, through the withdrawal channels, and through the means for conditioning the electrolyte.

5. The electrolysis cell of claim 4 wherein each of the elongated electrodes is mounted to form a gap between the elongated electrodes and the mounting plate, said mounting plate having ports communicating with the gap and with the means for conditioning the electrolyte, said withdrawal channels being formed by a separation between the elongated electrodes whereby the electrolyte circulates from a return channel, over the elongated electrode, through the withdrawal channel formed by the separation, through the ports and means for conditioning the electrolyte, and back to the return channel.

6. The electrolysis cell of claim 5 wherein the means for mounting to the conductive plate, the elongated electrode, and the return channel consist of a single electrode section comprising a plate mounting tab, an outwardly projecting portion to support the elongated electrode, a return channel mounted inwardly from the elongated electrode, and a thin insulating film on an outward surface of the return channel, said film supporting a diaphragm, and wherein the electrode assembly comprises the mounting plate, a plurality of the electrode sections mounted thereon to form the withdrawal channels as separations between the electrode sections whereby the electrolyte circulates through the return channels, over the elongated electrodes, through the withdrawal channels between the electrode sections, through the ports in the mounting plate, through the means for conditioning the electrolyte, and back to the return channels.

* * * * *